(12) United States Patent
Miyashita

(10) Patent No.: US 7,403,765 B2
(45) Date of Patent: Jul. 22, 2008

(54) INDIVIDUAL AUTHENTICATION METHOD FOR PORTABLE COMMUNICATION EQUIPMENT AND PROGRAM PRODUCT THEREFOR

(75) Inventor: Yukio Miyashita, Tokyo (JP)

(73) Assignee: NEC Corporation, Tokyo (JP)

( * ) Notice: Subject to any disclaimer, the term of this patent is extended or adjusted under 35 U.S.C. 154(b) by 335 days.

(21) Appl. No.: 10/242,414

(22) Filed: Sep. 13, 2002

(65) Prior Publication Data

US 2003/0054800 A1 Mar. 20, 2003

(30) Foreign Application Priority Data

Sep. 17, 2001 (JP) ............................. 2001-281663

(51) Int. Cl.
*H04M 1/66* (2006.01)
(52) U.S. Cl. ..................................... 455/411; 455/410
(58) Field of Classification Search ................. 455/550, 455/575, 411, 410, 422; 235/380, 382; 382/115, 382/124; 340/5.61, 5.74; 713/201
See application file for complete search history.

(56) References Cited

U.S. PATENT DOCUMENTS

| | | | | | |
|---|---|---|---|---|---|
| 4,882,474 | A | * | 11/1989 | Anderl et al. ................ | 235/380 |
| 4,993,068 | A | * | 2/1991 | Piosenka et al. ............. | 713/186 |
| 5,869,822 | A | * | 2/1999 | Meadows et al. ............ | 235/380 |
| 6,182,892 | B1 | * | 2/2001 | Angelo et al. ............... | 235/380 |
| 6,434,259 | B1 | * | 8/2002 | Hamid et al. ................ | 382/115 |
| 6,622,014 | B1 | * | 9/2003 | Daniel ......................... | 455/411 |
| 2002/0044650 | A1 | * | 4/2002 | Shen ........................... | 380/30 |
| 2002/0052192 | A1 | * | 5/2002 | Yamazaki et al. ........... | 455/411 |
| 2002/0109580 | A1 | * | 8/2002 | Shreve et al. ............... | 340/5.61 |
| 2002/0132634 | A1 | * | 9/2002 | Hiltunen ..................... | 455/550 |

FOREIGN PATENT DOCUMENTS

| | | |
|---|---|---|
| GB | 2 346 239 A | 8/2000 |
| JP | 59-009775 | 1/1984 |
| JP | 04-352548 | 12/1992 |
| JP | 2000-076412 | 3/2000 |
| JP | 2001-143077 | 5/2001 |
| JP | 2001-144748 | 5/2001 |
| JP | 2001-273135 | 10/2001 |
| WO | WO99/08217 | 2/1999 |

OTHER PUBLICATIONS

United Kingdom Search Report dated Feb. 28, 2003.

* cited by examiner

*Primary Examiner*—Duc Nguyen
*Assistant Examiner*—Wayne Cai
(74) *Attorney, Agent, or Firm*—McGinn IP Law Group, PLLC

(57) ABSTRACT

In an individual authenticating method for portable communication equipment which comprises a fingerprint sensor, an operating portion for inputting a personal identification number and controller for authenticating on the basis of fingerprint information and/or the personal identification number thus achieved whether a person to be authenticated is the identical person, the authentication of the person to be authenticated is performed by using fingerprint authentication when the importance level is lower or by using both of fingerprint authentication and personal identification number authentication when the importance level is higher. For example, plural authentication levels are set for the fingerprint authentication in accordance with the importance level of each of the plural functions provided to the portable communication equipment.

18 Claims, 7 Drawing Sheets

| LEVEL NAME | SECURITY LEVEL | AUTHENTICATING MEANS |
|---|---|---|
| 1 | LOW | FINGERPRINT AUTHENTICATION |
| 2 | NORMAL | FINGERPRINT AUTHENTICATION AND PIN INPUT |
| 3 | HIGH | FINGERPRINT AUTHENTICATION BASED ON TWO FINGERS AND PIN INPUT |

| LEVEL NAME | SECURITY LEVEL | AUTHENTICATING MEANS |
|---|---|---|
| 1 | LOW | FINGERPRINT AUTHENTICATION |
| 2 | NORMAL | FINGERPRINT AUTHENTICATION AND PIN INPUT |
| 3 | HIGH | FINGERPRINT AUTHENTICATION BASED ON TWO FINGERS AND PIN INPUT |

FIG.6

| LEVEL NAME | SECURITY LEVEL | AUTHENTICATING MEANS |
|---|---|---|
| 1 | LOW | FINGERPRINT AUTHENTICATION (1) |
| 2 | NORMAL | FINGERPRINT AUTHENTICATION (1) AND PIN INPUT |
| 3 | HIGH | FINGERPRINT AUTHENTICATION (2) AND PIN INPUT |

FIG.7

| SETTING NAME | SECURITY LEVEL | SETTING CONTENT |
|---|---|---|
| FINGERPRINT AUTHENTICATION (1) | LOW | AUTHENTICATED IF FINGERPRINT COLLATION SCORE IS ABOVE 500 |
| FINGERPRINT AUTHENTICATION (2) | HIGH | AUTHENTICATED IF FINGERPRINT COLLATION SCORE IS ABOVE 750 |

FIG.9A

<PLEASE SELECT MENU>

*TELEPHONE

*GAME

*E-MALL

*E-COMMERCE

FIG.9B

<PLEASE PUT YOUR FINGER>

<PLEASE INPUT YOUR PERSONAL IDENTIFICATION NUMBER>

○○-△△××

INDIVIDUAL AUTHENTICATION METHOD FOR PORTABLE COMMUNICATION EQUIPMENT AND PROGRAM PRODUCT THEREFOR

BACKGROUND OF THE INVENTION

1. Field of the Invention

The present invention relates to an individual authentication (attestation) method for portable communication equipment such as a cellular phone, PDA (Personal Digital Assistant) or the like, and a program product for implementing the individual authentication method.

2. Description of the Related Art

Recently, individual authentication for various applications containing electronic business using cellular phones has increased in importance. The conventional individual authentication using cellular phones has used input of personal identification numbers (passwords) as individual authenticating (attesting) means, and it has been considered to bring the cellular phones with an individual authenticating function based on biometrics as means having high security level. Fingerprint authentication has higher authentication precision among these biometrics authenticating means, and it has been expected as one of means having a good possibility that it is available in cellular phones from the aspect of the price, size, etc. of sensors.

However, the above conventional technique has the following disadvantages.

A first disadvantage resides in that in the conventional individual authentication method based on the personal identification number (PIN) inputting manner, there is a high risk that the personal identification number is stolen by another person, so that this method is insufficient in safety for electronic business, etc. which need high security level.

A second disadvantage resides in that in the conventional individual authentication method based on the personal identification number (PIN) inputting manner, as the digit number of the personal identification number is increased to enhance the security level, it is more unavailable and the probability that a user forgets his/her personal identification number is higher.

A third disadvantage resides in that in the conventional individual authentication method using a relatively cheap fingerprint sensor, it is impossible to achieve a high-quality fingerprint image stably and thus it is needed to input a fingerprint many times until a fingerprint suitable for authentication is achieved in order to enhance the authentication precision, so that this method is unavailable.

Japanese Laid-open Patent Publication No. 2000-076412 discloses a technique on a card to enhance the precision of identification of a person to be authenticated by using fingerprint authentication in combination with his/her personal identification number to identify the person concerned, Japanese Laid-open Patent Publication No. 2001-144748 discloses a technique of generating an enciphering key and a deciphering key on the basis of combination data of living body information such as a fingerprint and a password, Japanese Laid-open Patent Publication No. Sho-59-9775 discloses a technique on a magnetic card that has a secrete number recorded therein and has a fingerprint press portion onto which a fingerprint is impressed, and Japanese Laid-open Patent Publication No. Hei-4-352548 discloses a portable telephone which reads in the telephone number of a transactor by authenticating his/her fingerprint.

Particularly, Japanese Laid-open Patent Publication No. 2000-076412 and Japanese Laid-open Patent Publication No. 2001-144748 disclose techniques of keeping high security by using the input of the personal identification number and the fingerprint authentication in combination with each other. There is no description about unavailability of a fingerprint sensor in these publications. Further, when these techniques are used for authentication of a single function such as a credit card or the like, there is no problem in usability even if only one level is provided as the security level. However, in the case of the cellular phone, authentication in different security levels is needed for various situations from such a situation that a user needs permission of change of a simple setting to such a situation that a user needs authentication of electronic commerce. If such situations are supported by using only one security level, the security level must be set to the highest security level, so that these techniques are unavailable particularly when the permission of change of a simple setting is required.

Conventional cellular phones have some functions needing input of personal identification numbers, however, the security levels to be required are not so high. However, since it is expected that functions needing higher security levels such as electronic commerce will be equipped to cellular phones, it is required to bring plural security levels in accordance with the importance level of each function.

SUMMARY OF THE INVENTION

According to a first aspect of the present invention, there is provided an individual authenticating method for portable communication equipment which comprises recognizing means for recognizing a fingerprint, inputting means for inputting a personal identification number and controlling means for controlling the operation of the recognizing means and inputting means and authenticating whether a person to be authenticated is the identical person on the basis of the fingerprint information and/or the personal identification number thus achieved, the individual authenticating method comprising: a step of judging the importance level of each of plural functions provided to the portable communication equipment by the controlling means; and a step of selecting fingerprint authentication or both of the fingerprint authentication and personal identification number authentication by the controlling means in accordance with the importance level.

Further, according to a second aspect of the present invention, there is provided a program product embodied on a storage portion of portable communication equipment and comprising code that, when the program product is executed, cause the portable communication equipment to perform an individual authenticating method comprising the steps of: judging the importance level of each of plural functions provided to the portable communication equipment; and selecting fingerprint authentication or both of fingerprint authentication and personal identification number authentication in accordance with the importance level.

BRIEF DESCRIPTION OF THE DRAWINGS

FIG. 6 is a diagram showing an example of the security level setting in the cellular phone according to the present invention;

FIG. 7 is a diagram showing an example of the security level setting in the cellular phone according to the present invention;

FIGS. 9A to 9C are diagrams showing displays of the cellular phone using the individual authenticating method according to the present invention.

DETAILED DESCRIPTION OF THE PREFERRED EMBODIMENTS

Figures 1, 2:
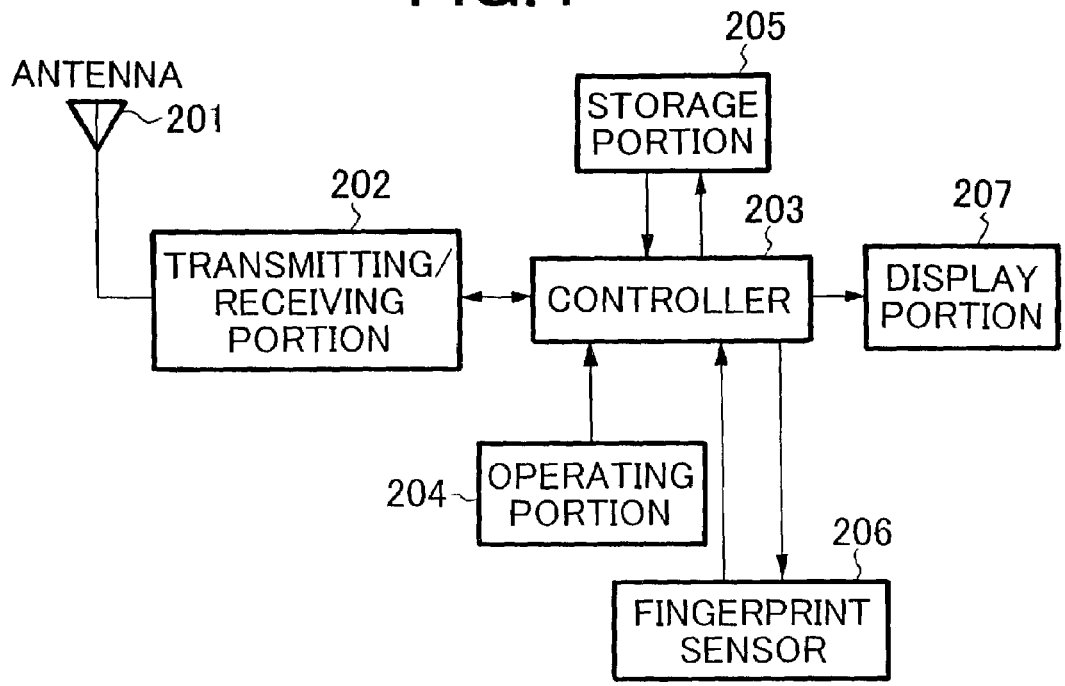
FIG. 1 is a block diagram showing the construction of the cellular phone according to the present invention.
FIG. 2 is a diagram showing an example of security level setting in a cellular phone according to the present invention.

Preferred embodiments according to the present invention will be described hereunder with reference to the accompanying drawings.

First, the construction of a cellular phone according to the present invention will be described with reference to FIG. 1.

Antenna 201 and transmitting/receiving portion 202 are the same as a general cellular phone. Controller 203 controls transmitting and receiving operations, and also controls the change of security levels described later.

When a user of a cellular phone carries out any function of the cellular phone, he/she calls up the function by manipulating an operating portion 204 while he/she looks at the screen of display portion 207. At this time, the controller 203 judges whether the call-up function is needed to be authenticated. If the authentication is needed, the controller 203 displays on the screen of the display portion 207 the indication of which the user is urged to be authenticated.

When the authenticating means is fingerprint authentication, a fingerprint is inputted from fingerprint sensor 206, and when the authenticating means is PIN (personal identification number) input, a personal identification number is inputted from the operating portion 204. The authentication is actually carried out in the controller 203 by collating the information thus inputted with personal identification numbers or fingerprint information registered in a storage portion 205 in advance, and then displaying an authentication result on the display portion 207.

Next, means of setting plural security levels will be described with reference to FIG. 2.

FIG. 2 shows an example of the setting of the security level in the cellular phone according to the present invention. The importance levels "1" to "3" are set in accordance with the functions of the cellular phone, and the security level to be required is increased as the number increases. The authentication based on the level "1" uses fingerprint authentication in which a user is merely needed to put his/her finger on a fingerprint detecting portion because this authentication gives priority to convenience. The authentication based on the level "2" uses both the fingerprint authentication and the PIN input authentication because it needs a certain level of security. In this authentication, both of the fingerprint authentication and the PIN input authentication must be satisfied. The authentication based on the level "3" uses both of the fingerprint authentication carried out twice (i.e., by using different two fingers) and the PIN input authentication, that is, it needs three-times authentication because it attaches most importance to security. Any one of these three security levels is allocated to all the functions that need authentication in the cellular phone.

In this embodiment, the number of the security levels is set to three, however, it may be set to four or more. In this case, the authentication may be carried out by increasing the frequency of the fingerprint authentication or the frequency of the PIN input (the personal identification number is stored at plural times).

Next, a operation flow until the authentication function is executed will be described with reference to FIGS. 3 to 5.

Figure 3:
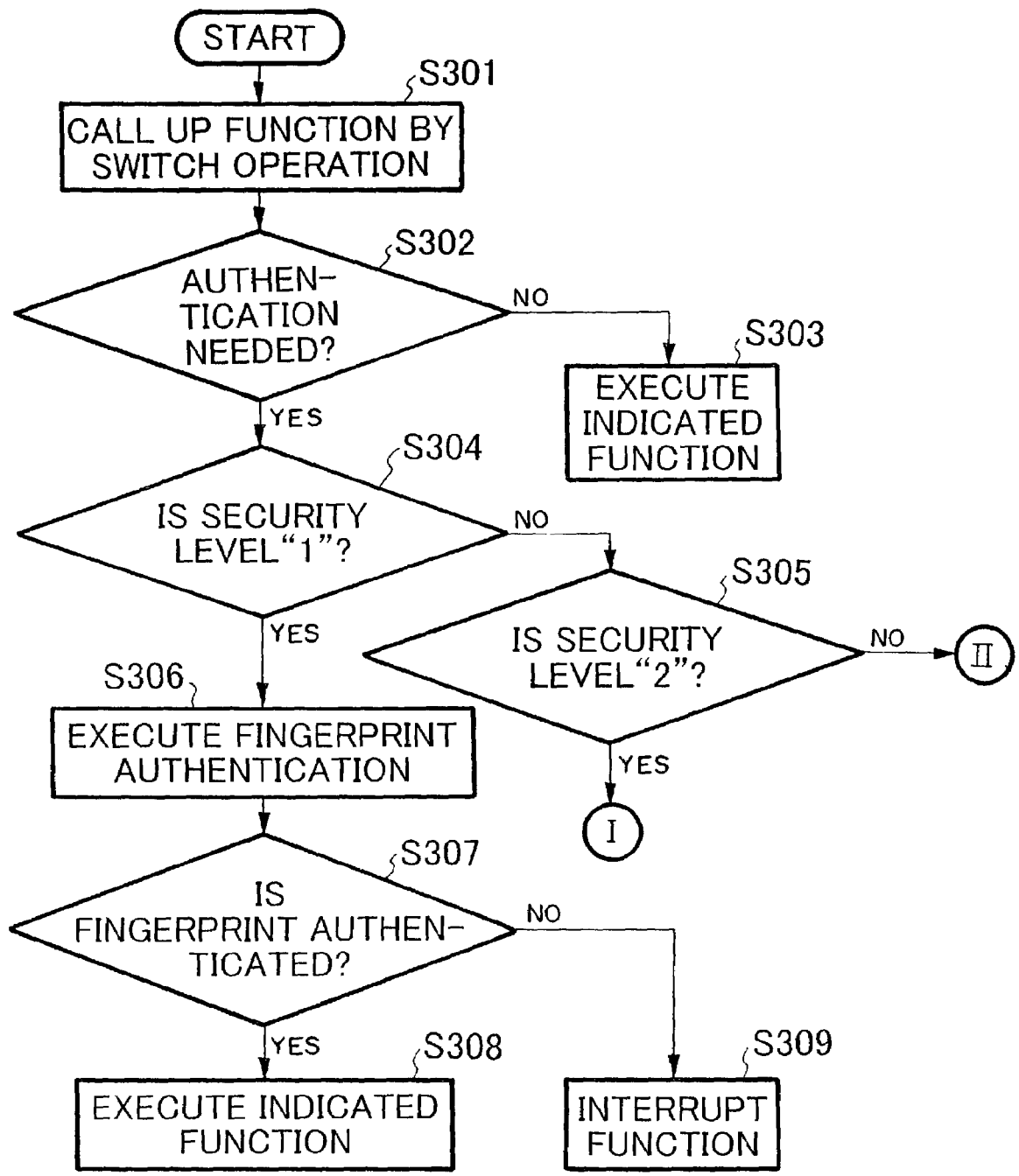
FIG. 3 is a flowchart showing an individual authenticating method for a cellular phone according to the present invention.

In FIG. 3, when a user of a cellular phone calls up any function through a switching operation on the cellular phone (step S301), the controller 203 of FIG. 1 checks whether the function thus called up needs authentication (step S302). If no authentication is needed ("No" in step S302), the call-up function is executed (step S303). However, if it needs authentication ("YES" in step S302), it is first checked whether the security level is equal to "1" (step S304). If the security level is equal to "1" ("YES" in step S304), the fingerprint authentication is carried out (step S306). As a result, if the fingerprint authentication succeeds ("YES" in step S307), the indicated function is executed (step S308). On the other hand, if the fingerprint authentication fails ("NO" in step S307), the indicated function is not executed and the function is interrupted (step S309).

In the check as to whether the security level is equal to "1" (step S304), if the security level is not equal to "1" ("NO" in step S304), it is subsequently checked whether the security level is equal to "2" (step S305). As a result, if the security level is equal to "2" ("YES" in step S305), the fingerprint authentication is executed (step S401). If the authentication fails ("NO" in step S402), the indicated function is not executed and the function is interrupted (step S403). On the other hand, if the fingerprint authentication succeeds ("YES" in step S402), the authentication is subsequently shifted to the PIN input authentication (step S404). If the personal identification number input is authenticated ("YES" in step S405), the indicated function is executed (step S406). On the other hand, if the personal identification number is not authenticated ("NO" in step S405), the indicated function is not executed and the function is interrupted (step S403).

In the check as to whether the security level is equal to "2" (step S305), if the security level is not equal to "2" ("NO" in step S305), it is judged that the security level is equal to "3" (step S501), and the fingerprint authentication based on a first finger is executed (step S502). If the authentication fails ("NO" in step S503), the indicated function is not executed and the function is interrupted (step S504). On the other hand, if the authentication succeeds ("YES" in step S503), the fingerprint authentication based on a second finger is executed (step S505).

If the authentication fails ("NO" in step S506), the indicated function is not executed and the function is interrupted (step S504). On the other hand, if the authentication succeeds ("YES" in step S506), the PIN input authentication is executed (step S507). If the personal identification number is not authenticated ("NO" in step S508), the indicated function is not executed and the function is interrupted (step S504). On the other hand, if the personal identification number is authenticated ("YES" in step S508), the indicated function is executed (step S509).

The above-described operations correspond to the following operations at the user side of the cellular phone.

A menu screen as shown in FIG. 9A is displayed on the display portion 207 by manipulating the operating portion 204 of a cellular phone, and a user of the cellular phone selects any one of "telephone", "game", "electronic mail" and "electronic commerce", for example, on the menu screen.

Here, when "game" is selected, no problem would occur even if a person other than the original uses the cellular phone, so that the controller 203 judges that authentication is unnecessary and the game is executed (started). As shown in FIG. 9A, when "electronic commerce" is selected, the security level "3" is judged because high secrecy is needed. Therefore, a indication "<Please put your finger (index finger)>" is displayed. If authentication is possible, "OK" is displayed. Subsequently, a indication "<Please put your finger (middle finger)>" is displayed, and if authentication is possible, "OK" is displayed. Thereafter, as shown in FIG. 9C, a indication "<Please input your personal identification number>" is displayed to instruct input of the personal identification number. When the person is acknowledged as the original with the authentication results on the basis of the two fingers and the personal identification number, this fact is displayed as "<authenticated>" on the display portion 207, and the electronic commerce is executed (started).

Next, another embodiment of the change of the security level in which the security level is changed by setting and switching authentication software will be described with reference to FIGS. 6 to 8.

FIG. 6 shows an example of the security level setting in this embodiment. This embodiment is the same as the above embodiment in that the importance levels "1" to "3" are set in accordance with the functions of the cellular phone. In this case, as the number increases, the security level to be required is also increased. The authentication based on the levels "1" and "2" is the same as the above embodiment. However, this embodiment is different from the above-described embodiment in that the authentication based on the level "3" uses one fingerprint authentication and PIN input authentication, and the fingerprint authentication is carried out after it is switched to the higher level as shown in FIG. 7. In this case, the fingerprint authentication may be carried out only once.

FIG. 7 shows an example of the fingerprint authentication security levels of this embodiment.

In this example, two stages (lower security level stage and higher security level stage) are provided for the fingerprint authentication. The difference between the two security levels resides in the difference in score for judgement of a collation result. The setting of the authentication security level is switched by the controller 203. The score is a numeral by which the similarity of a fingerprint is represented. Therefore, as the numeral increases, the fingerprint is closer to the actual one. For example, it is assumed that if one of feature points representing the feature of a fingerprint is consistent, the score is equal to "50". In this case, if ten of the feature points are consistent, the score is equal to "500". The lower authentication level (1) means a case where the score is equal to 500 or more, and the higher authentication level (2) means a case where the score is equal to 750 or more. As a result of the collation between an input fingerprint and registered fingerprints, if the score is equal to or higher than a predetermined set value, the controller 203 identifies the person as the original. On the other hand, if the score is lower than the predetermined set value, the controller 203 identifies the person as another person. Accordingly, as the score value is increased, it is necessary to input a fingerprint more accurately, and the security level is also increased. The low level (authentication level (1)) is set in the initial state, and the level is switched to the high level (authentication level (2)) only when the security level "3" is specified.

Figure 8:
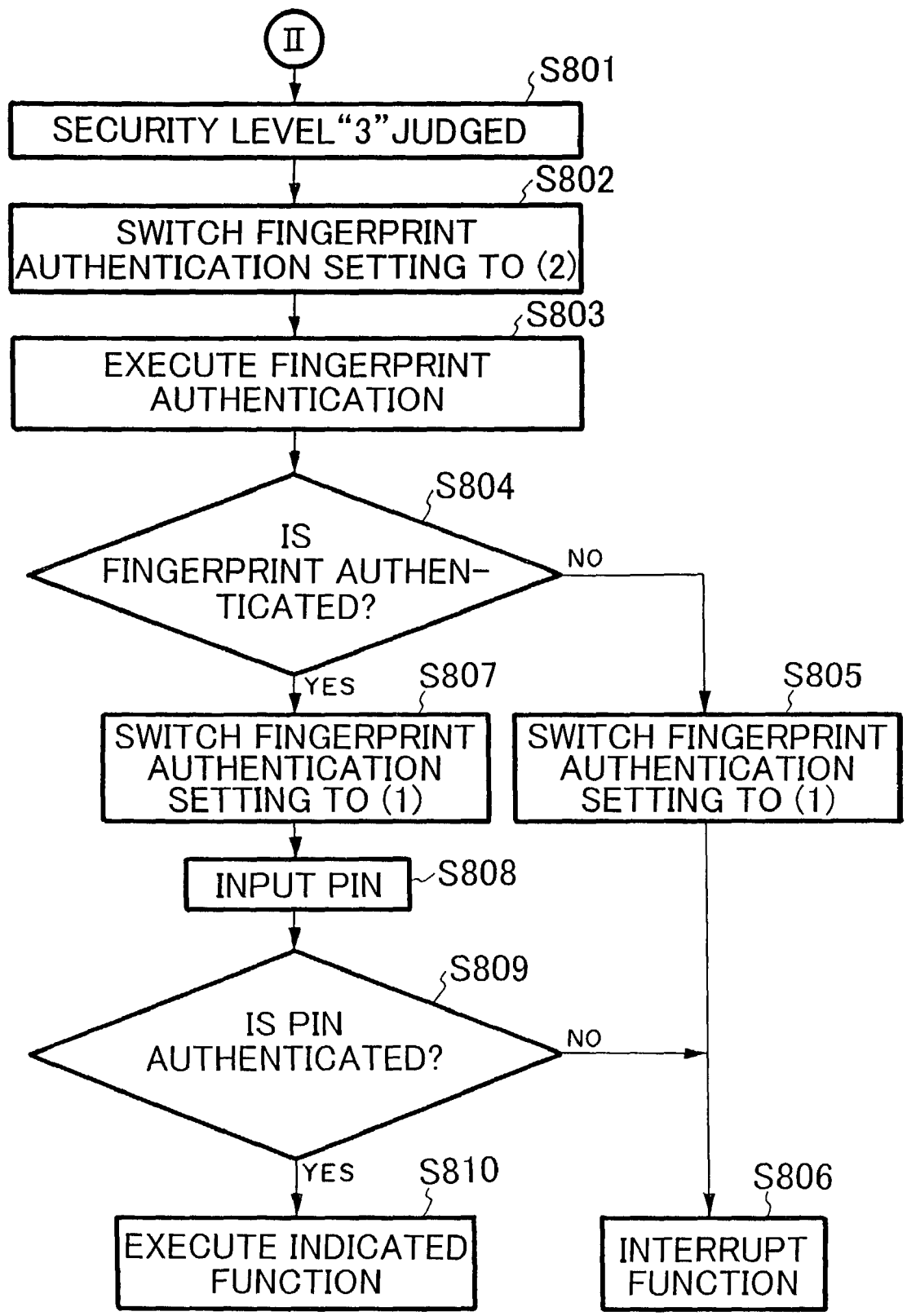
FIG. 8 is a flowchart showing the individual authenticating method for the cellular phone according to the present invention.

FIG. 8 is a flowchart showing the flow of the operations until the authentication function is executed in this embodiment.

Figure 4:
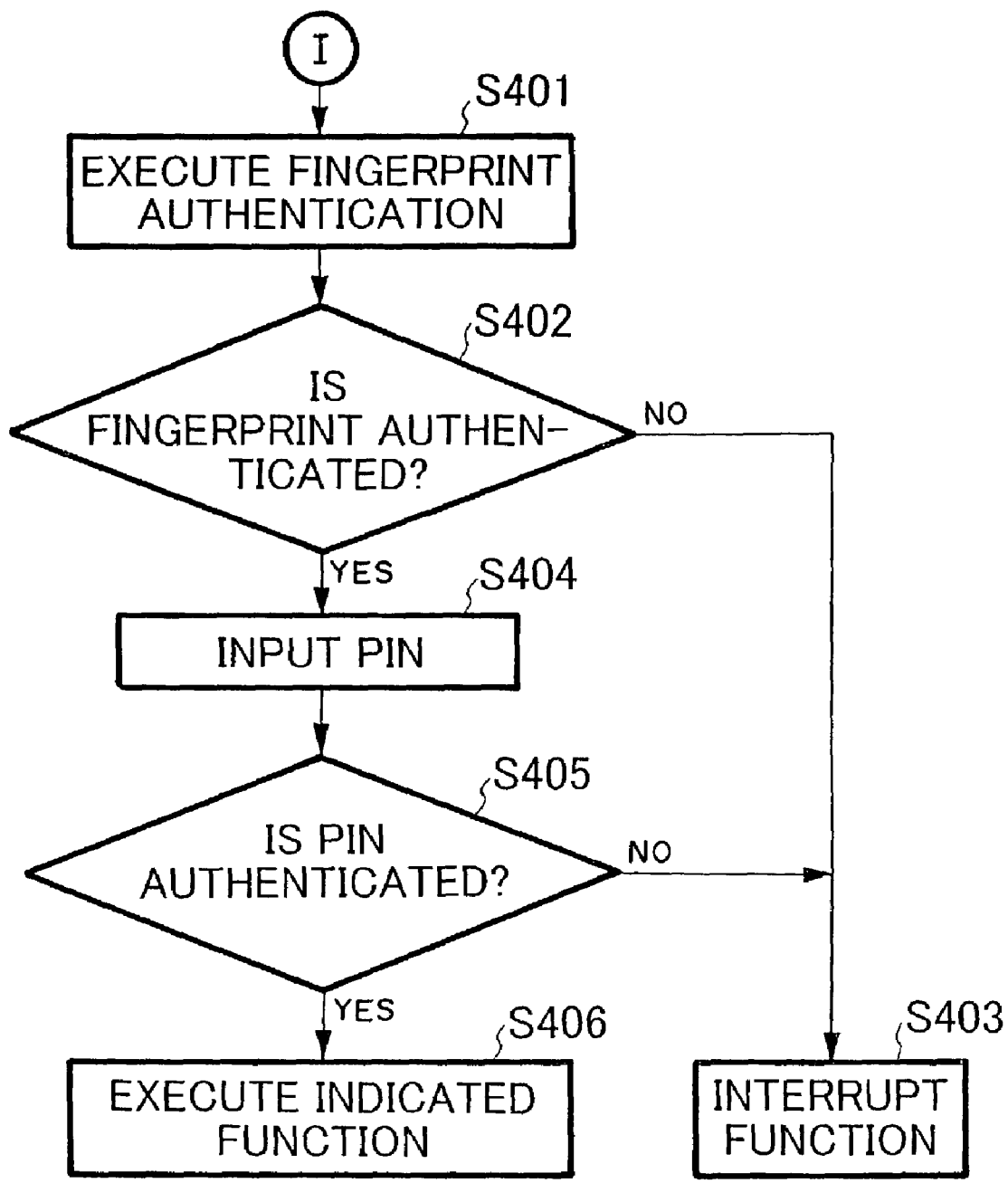
FIG. 4 is a flowchart showing the individual authenticating method for the cellular phone according to the present invention.
Figure 5:
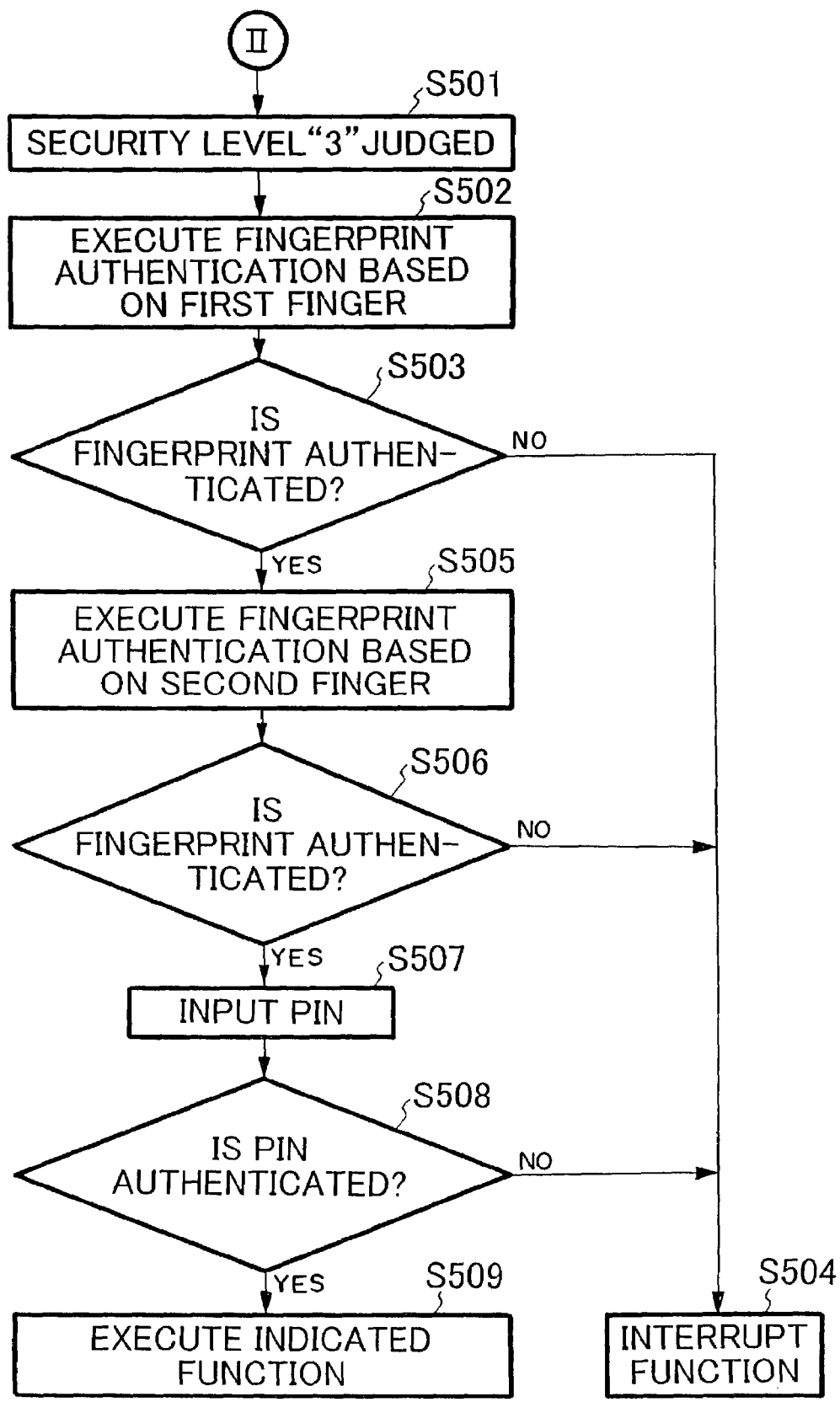
FIG. 5 is a flowchart showing the individual authenticating method for the cellular phone according to the present invention.

The operations prior to (II) of FIG. 8 are the same as those of FIGS. 3 and 4. In FIG. 8, if the security level is judged as "3" (step S801), the controller 203 switches the fingerprint authentication setting to the fingerprint authentication (2) (step S802), and the fingerprint authentication is executed (step S803). If the authentication fails ("NO" in step S804), the fingerprint authentication setting is switched to the fingerprint authentication (1) (step S805), and the function is interrupted without carrying out the indicated function (step S806). On the other hand, if the authentication succeeds ("YES" in step S804), the fingerprint authentication setting is switched to the fingerprint authentication (1) (step S807), and subsequently the PIN input is executed (step S808). If the personal identification number is not authenticated ("NO" in step S809), the indicated function is not executed and the function is interrupted (step S806). If the personal identification number is authenticated ("YES" in step S809), the indicated function is executed (step S810).

The authenticating method of the original as shown in FIGS. 3, 4, and 5, or 3, 4, and 8 is described as a program, and the program product (program) may be stored in the storage portion 205 shown in FIG. 1 or stored in another storage portion which is separately equipped. Accordingly, the authenticating method of the original as shown in FIGS. 3, 4, and 5, or 3, 4, and 8 may be performed on the basis of the program by the controller 203.

According to the present invention, there can be achieved the following effects.

A first effect resides in that a burdensome work of inputting a personal identification number which has been of a disadvantage in the conventional cellular phone can be avoided. This is because the fingerprint authenticating means convenient for users can be used in place of the PIN input authentication with respect to the functions having low security levels.

A second effect resides in that with respect to authentication in plural kinds of cellular phones, the security level which is in conformity with each function can be implemented. This is because the plural authenticating means of the PIN input authentication and the fingerprint authentication can be used in combination, so that plural security levels can be implemented by combining the plural authenticating means.

A third effect resides in that an inexpensive fingerprint sensor is usable. This is because it is unnecessary to implement high security by using only the fingerprint authentication, and thus it can be used although it provides somewhat low image quality and low authentication precision.

What is claimed is:

1. An individual authenticating method for portable communication equipment including plural wireless communication functions, said individual authenticating method comprising:

setting plural importance levels for said plural wireless communication functions provided on said portable communication equipment and setting plural authentication levels for fingerprint authentication in accordance with said plural importance levels;

judging, by a controlling means on said portable communication equipment, an importance level and an authentication level for fingerprint authentication of a wireless communication function selected by an individual on the portable communication equipment from said plural wireless communication functions;

selecting, by said controlling means on said portable communication equipment, one of a fingerprint authentication and both of the fingerprint authentication and a personal identification number authentication in accordance with the importance level judged by said controlling means; and authenticating, by said controlling means on said portable communication equipment, said individual on a basis of authentication information input by the individual on said portable communications equipment in accordance with the authentication selected by said controlling means and in comparison with said authentication level for fingerprint authentication, wherein said portable communication equipment comprises one of a cellular phone and a personal digital assistant, and wherein said plural wireless communication functions comprise one of a telephone communication function, an electronic mail communication function and an electronic commerce transaction function.

2. The method as claimed in claim 1, wherein the plural authentication levels are set by changing a number of fingers to be authenticated.

3. The method as claimed in claim 1, wherein the plural authentication levels are set by changing a number of consistent feature points between feature points representing a feature of a finger to be authenticated and feature points of a pre-registered fingerprint.

4. The method as claimed in claim 1, further comprising:
judging, by said controlling means of said portable communication equipment, whether an authentication of a function selected from the plural functions provided to said portable communication equipment is necessary,
wherein the plural functions further comprise a function that an authentication is unnecessary.

5. The method as claimed in claim 1, wherein said portable communication equipment further comprises recognizing means for recognizing a fingerprint, inputting means for inputting a personal identification number, and a storage portion containing personal identification numbers and fingerprint information corresponding to authorized users of the portable communication equipment, said method further comprising:
receiving said authentication information from said recognizing means and inputting means inputted by the individual, corresponding to the authentication selected by said controlling means in accordance with the judged importance level; and
collating the input authentication information against the personal identification numbers and fingerprint information corresponding to authorized users contained in said storage portion to determine an authentication result.

6. The method as claimed in claim 1, wherein said recognizing means comprises a fingerprint sensor.

7. The method as claimed in claim 1, wherein upon selection of one of said plural functions by the individual, the individual must satisfy the authentication selected by the controlling means before the selected function is executed on the portable communications equipment.

8. A programmable storage medium tangibly embodying a program of machine-readable instructions executable by a digital processing apparatus in portable communication equipment to perform operations supporting an individual authenticating method comprising:
setting plural importance levels for each of a plurality of wireless communication functions provided on said portable communication equipment and setting plural authentication levels for fingerprint authentication in accordance with said importance levels;
judging an importance level and an authentication level for fingerprint authentication of a wireless communication function selected by an individual on the portable communication equipment from said plural wireless communication functions for execution on the portable communication equipment;
selecting one of a fingerprint authentication and both of said fingerprint authentication and a personal identification number authentication in accordance with the judged importance level; and
authenticating an individual on a basis of authentication information input by the individual in accordance with the selected authentication in comparison with said authentication level for fingerprint authentication,
wherein said portable communication equipment comprises one of a cellular phone and a personal digital assistant, and
wherein said plural wireless communication functions comprise one of a telephone communication function, an electronic mail communication function and an electronic commerce transaction function.

9. The programmable storage medium tangibly embodying a program of machine-readable instructions as claimed in claim 8, said individual authenticating method further comprising:
judging whether an authentication of a function selected from the plural functions provided to said portable communication equipment is necessary,
wherein the plural functions further comprise a function that an authentication is unnecessary.

10. The programmable storage medium tangibly embodying a program of machine-readable instructions as claimed in claim 8, said individual authenticating method further comprising:
receiving said authentication information input into the portable communication equipment by the individual, said authentication information corresponding to the authentication selected in accordance with the importance level; and
collating the input authentication information against personal identification numbers and fingerprint information corresponding to authorized users to determine an authentication result.

11. The programmable storage medium tangibly embodying a program of machine-readable instructions as claimed in claim 8, wherein upon selection of one of said plural functions by the individual, the individual must satisfy the selected authentication before the selected function is executed on the portable communications equipment.

12. A portable communications equipment including a system for authenticating an individual using the portable communications equipment, said system for authenticating comprising:
a plurality of wireless communication functions executable on the portable communications equipment;
a plurality of authentication modules to determine an identity of the individual using the portable communications equipment;
a plurality of security levels, each of said plurality of security levels being associated with at least one of said plurality of authentication modules;
a plurality of authentication levels for fingerprint authentication being associated with at least one of said plurality of security levels;

a calculator to judge an importance level of a wireless communication function selected by an individual on the portable communication equipment from said plurality of wireless communication functions and to assign said wireless communication function to one of said plurality of security levels in accordance with the judged importance level; and an input section that receives authentication information associated with said at least one of said plurality of authentication modules, wherein upon the selection of said wireless communication function by the individual, the individual must input said authentication information associated with the security level assigned to the selected wireless communication function for comparison with an authentication level for fingerprint authentication associated with said assigned security level before the selected wireless communication function is executed on the portable communications equipment, and the portable communications equipment comprises one of a cellular phone and a personal digital assistant, and wherein said plural wireless communication functions comprise one of a telephone communication function, an electronic mail communication function and an electronic commerce transaction function.

13. The portable communications equipment according to claim 12, wherein said authenticating module performs one of:

authentication of a fingerprint of the individual;

verification of a personal identification number input by the individual; and authentication of multiple fingerprints of the individual.

14. The portable communications equipment according to claim 13, wherein authentication of one or more fingerprints comprises:

determination of a number of consistent feature points between feature points representing a fingerprint of the individual to be authenticated and feature points of a pre-registered fingerprint.

15. The portable communications equipment according to claim 13, wherein said authentication level comprises a number of consistent feature points required for authentication.

16. The portable communications equipment according to claim 12, wherein said calculator further determines whether each of said plurality of functions requires an authentication of the user before execution.

17. The portable communications equipment according to claim 16, wherein authentication of a function selected from the plurality of functions of said portable communication equipment is performed only when authentication is judged to be necessary.

18. An individual authenticating method for portable communication equipment including a plurality of wireless communication functions, said individual authenticating method comprising:

judging, by a controlling means on said portable communication equipment, whether an authentication of a wireless communication function selected by an individual on the portable communication equipment from said plurality of wireless communication functions for execution on said portable communication equipment is necessary;

judging, by said controlling means on said portable communication equipment, an importance level of the selected wireless communication function when the authentication of the selected function is necessary;

selecting, by said controlling means on said portable communication equipment, one of a fingerprint authentication and both of the fingerprint authentication and a personal identification number authentication in accordance with the importance level judged by said controlling means; and authenticating, by said controlling means on said portable communication equipment, said individual on a basis of authentication information input by the individual on said portable communication equipment in accordance with the authentication selected by said controlling means, wherein said portable communication equipment comprises one of a cellular phone and a personal digital assistant, wherein plural authentication levels are set for the fingerprint authentication in accordance with an importance level of each of the plural wireless communication functions provided to said portable communication equipment, wherein the plural authentication levels are set by changing a number of fingers to be authenticated, and wherein said plural wireless communication functions comprise one of a telephone communication function, an electronic mail communication function and an electronic commerce transaction function, and a function that an authentication is unnecessary.

* * * * *